(12) United States Patent
Gold et al.

(10) Patent No.: US 7,311,357 B2
(45) Date of Patent: Dec. 25, 2007

(54) INFANT SURROUND SUPPORT

(75) Inventors: Katherine Gold, Denver, CO (US); Lynn Rosen, Parker, CO (US)

(73) Assignee: Gold Bug, Inc., Aurora, CO (US)

( * ) Notice: Subject to any disclaimer, the term of this patent is extended or adjusted under 35 U.S.C. 154(b) by 14 days.

(21) Appl. No.: 11/211,886

(22) Filed: Aug. 25, 2005

(65) Prior Publication Data

US 2007/0138845 A1   Jun. 21, 2007

(51) Int. Cl.
  *A47C 31/10* (2006.01)
(52) U.S. Cl. .................................. 297/219.12
(58) Field of Classification Search ............ 297/250.1, 297/219.12, 230.13, 256.15
  See application file for complete search history.

(56) References Cited

U.S. PATENT DOCUMENTS

| | | | |
|---|---|---|---|
| 4,383,713 A | 5/1983 | Roston | |
| D300,694 S | 4/1989 | Krok | |
| 5,127,120 A | 7/1992 | Mason | |
| D328,683 S | 8/1992 | Kalozdi | |
| 5,228,745 A * | 7/1993 | Hazel ................. | 297/219.12 X |
| 5,310,245 A | 5/1994 | Lyszczasz | |
| 5,586,351 A | 12/1996 | Ive | |
| D389,359 S | 1/1998 | Nowak | |
| 5,826,287 A | 10/1998 | Tandrup | |
| 5,829,830 A | 11/1998 | Maloney | |
| 5,842,739 A | 12/1998 | Noble | |
| 5,916,089 A | 6/1999 | Ive | |
| 5,918,933 A | 7/1999 | Hutchinson et al. | |
| 5,934,749 A | 8/1999 | Pond et al. | |
| 5,937,461 A | 8/1999 | Dombrowski et al. | |
| 6,036,263 A * | 3/2000 | Gold ..................... | 297/219.12 |
| 6,341,818 B1 | 1/2002 | Verbovszky et al. | |
| 6,363,558 B1 * | 4/2002 | Dunne ............... | 297/219.12 X |
| 6,386,639 B1 * | 5/2002 | McMichael ........ | 297/219.12 X |
| 6,454,352 B1 | 9/2002 | Konovalov et al. | |
| 6,467,840 B1 * | 10/2002 | Verbovszky et al. ... | 297/219.12 |
| 6,473,923 B1 | 11/2002 | Straub | |
| 6,814,405 B2 * | 11/2004 | Norman ................. | 297/219.12 |
| 6,918,631 B2 * | 7/2005 | Verbovszky ........... | 297/219.12 |
| 6,926,359 B2 * | 8/2005 | Runk .................... | 297/219.12 |
| 6,966,089 B2 * | 11/2005 | Gold et al. ......... | 297/219.12 X |
| 7,097,243 B2 * | 8/2006 | Verbovszky ........... | 297/219.12 |
| 2002/0014793 A1 | 2/2002 | Santha | |

* cited by examiner

*Primary Examiner*—Rodney B. White
*Assistant Examiner*—Stephen Vu
(74) *Attorney, Agent, or Firm*—Ellen Reilly; John E. Reilly; The Reilly Intellectual Property Law Firm, P.C.

(57) ABSTRACT

An infant surround support having a head support member and opposite side support members and foot rest members forming a relatively continuous peripheral cushion support for an infant.

11 Claims, 3 Drawing Sheets

INFANT SURROUND SUPPORT

BACKGROUND

The article of manufacture relates generally to infant surround supports and more particularly to an infant body support including raised side supports continuous with closely spaced footrest members forming a relatively continuous surrounding support for an infant.

Infant supports for insertion in a child carrier are well-known in the prior art. These include infant supports having a raised, cushioned head support as in my U.S. Pat. No. 6,036,263. Further, a number of patents disclose support articles with spaced apart cushion elements as in U.S. Pat. No. 5,916,089 to Ive, U.S. Pat. No. 5,310,245 to Lyszczasz and U.S. Pat. No. 5,826,287 to Tandrup. The prior art does not address the need for a relatively continuous infant support which is flexible, permitting hinging of the base layer while also adequately supporting an infant.

The following embodiments and aspects thereof are described and illustrated in conjunction with systems which are meant to be exemplary and illustrative, not limiting in scope.

SUMMARY

The embodiments set forth are exemplary and not for purposes of limitation. The present embodiments are designed to provide a novel and improved infant body support that inserts into any standard carseat as well as fitting on a changing table or the like. The present embodiments provide a surrounding support for an infant on a flat surface as well as in a carseat, stroller or the like. Additionally, the present embodiments provide additional support for a premature or smaller infant. Due to the flexibility of the support, it may be arranged in various positions without having separate attachment pieces. Further, the construction of the lower end of the support allows an infant to move his or her legs while still providing a sense of support and comfort.

Alternate embodiments which are not meant to be limiting include a tri-sectional support assembly having a head support member, side support members and foot rest members.

In accordance with the present embodiments, there is provided an infant surround support comprising a padded base layer, a head support member attached to an upper portion of the base of the padded base layer, opposite side support members and foot rest members defining a relatively continuous raised peripheral cushioned support, a lower portion of the base layer including a recess in the form of a generally U-shaped open slot and the foot rest members. The foot rest members form generally hook-shaped returns in surrounding relation to the slot. The spacing of the head support member and the upper ends of the side support members may permit hinging or flexing of the base layer therebetween. The infant surround support, including the continuous cushion support and the head support member substantially surround an infant on the base layer.

The foregoing examples of the related art and limitations related therewith are intended to be illustrative and not exclusive. Other limitations of the related art will become apparent to those skilled in the art upon a reading of the specification and a study of the drawings.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced Figures of the drawings. It is intended that the embodiments and Figures disclosed herein are to be considered illustrative rather than limiting.

DETAILED DESCRIPTION

Figures 1, 2:
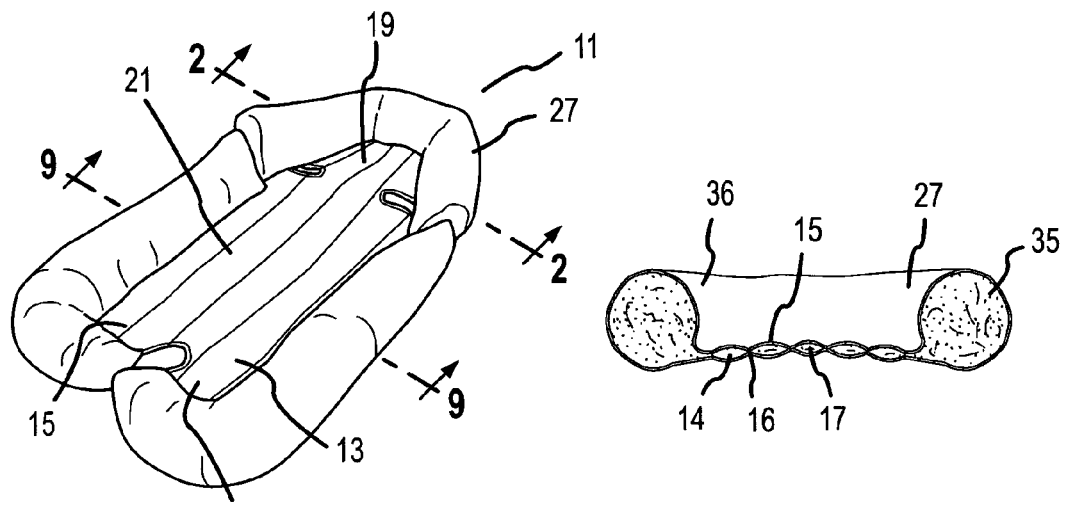
FIG. 1 is a perspective view of an infant surround support according to one embodiment.
FIG. 2 is a side view in cross-section about lines 2-2 of the infant support according to FIG. 1.
Figure 3:
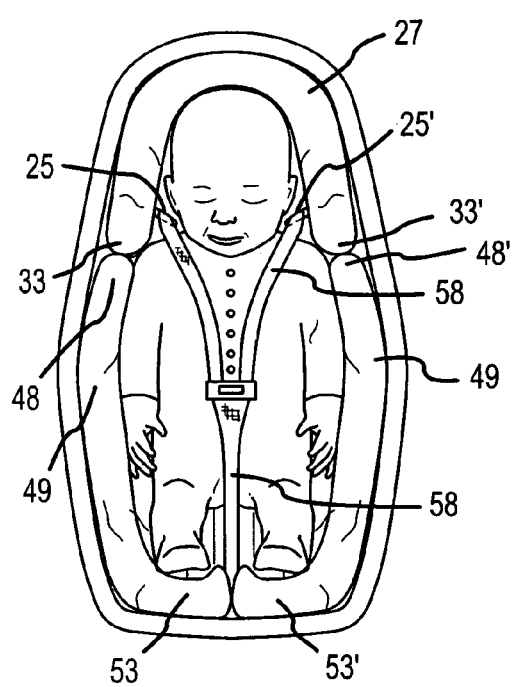
FIG. 3 is a front elevational view of the infant surround support shown in FIG. 1 with an infant placed within the infant support and the infant support placed within a carrier device.
Figure 4:
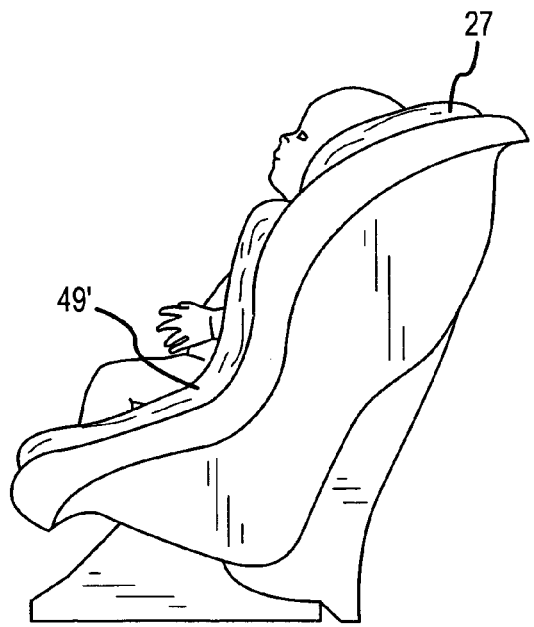
FIG. 4 is a side elevational view of the infant surround support shown in FIG. 3.
Figure 5:
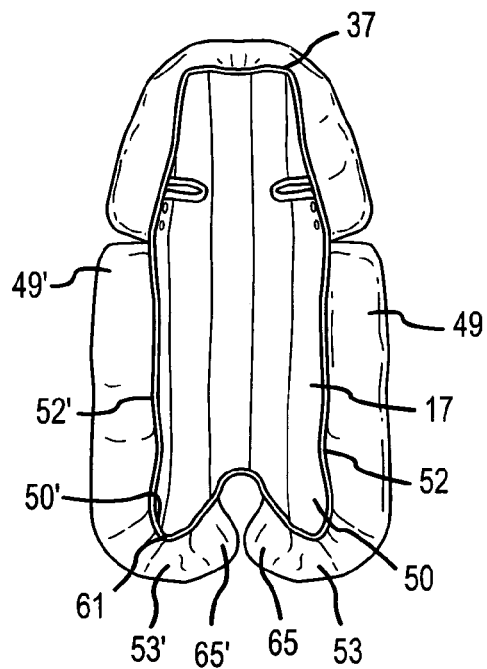
FIG. 5 is a rear view of the infant support shown in FIG. 1.
Figure 6:
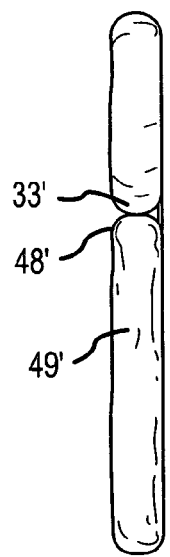
FIG. 6 is a side view of the infant support.
Figure 7:
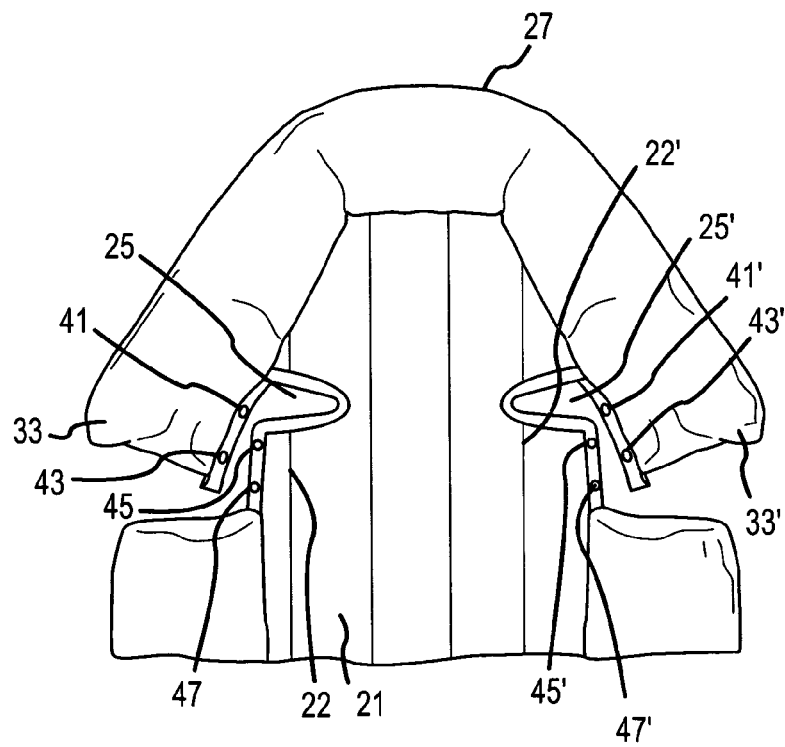
FIG. 7 is a partially exploded front view of the infant support of FIG. 1.

An infant surround support 11 of one of the present embodiments is illustrated in FIGS. 1 through 9 and is generally shown in FIG. 1 wherein the support 11 includes a base layer 13 having a top surface 15 and a bottom surface 17 as shown in FIG. 5. The top and bottom surfaces 15, 17 are made up of a soft fabric which is sewn together forming slightly padded sections 14 with intermittent stitching 16. See FIGS. 2 and 9. The base layer 13 also includes an upper portion or first end 19, a mid portion 21 and a lower portion or second end 23. The upper portion 19 of the base layer 13 comprises a raised, padded head support or roll 27, as shown in FIGS. 1 and 2. The head support 27 is generally circular in shape and forms a close fitting support around an infant's head as shown in FIG. 3. Padding 35, typically a polyester or cotton material, is inserted within the head support 27 and covered with a soft, washable material 36 as shown in FIG. 2. The head support 27 is generally U-shaped with downwardly directed opposite, first terminal ends or distal ends 33, 33' as shown in FIG. 7. The distal ends may diverge outwardly or converge inwardly depending upon the configuration desired. The head support 27 is secured to the upper portion 19 of the upper surface 15 of the base layer 13 with stitching 37 as shown in FIG. 5. There are slots 25, 25' which allow for pass through of an infant restraint device 58. The distal ends 33, 33' also include adjustment members or snaps 41, 41', 43, 43' with complementary fasteners 45, 45', 47, 47' located along an upper portion 22, 22' of the mid portion 21 of the base layer 13 as shown in FIG. 7. The adjustment snaps and matching connectors allow for adjustability of the head support 27 as well as enabling pass through the shoulder straps of the child restraint 58. The adjustability of the head support 27 allows for manipulation of the distal ends 33, 33' so as to securely place the infant's head within the head support 27 and obtain adequate support for the head and neck of an infant, particularly a premature or small infant.

The distal ends 33, 33' are in closely spaced relationship to opposite, second terminal ends or upper ends 48, 48' of opposite side supports 49, 49'. The closely confronting relationship of the distal ends 33, 33' and the ends 48, 48' allow for bending or flexing of the base layer 13 and flexibility of the infant support while providing virtually continuous support between the head and sides of the infant support. This is demonstrated in FIG. 3 where the support 11 is placed within a child carrier. The upper portion 19 is slightly tilted forward causing the distal ends 33, 33' to be in touching relation to the upper ends 48, 48' of the side supports 49, 49' as shown in FIGS. 3 and 6.

Figure 9:
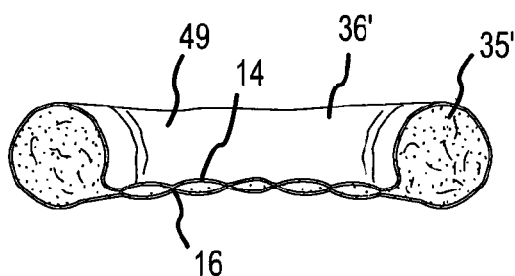
FIG. 9 is a cross-sectional view of the infant body support taken about lines 8-8 of FIG. 1.

The opposite side supports 49, 49' comprise raised, padded, peripheral supports as shown in FIGS. 5 and 9. The side supports 49, 49' include a cotton or polyester padding material 35' surrounded by a washable, soft fabric covering 36'. The padding of the side supports 49, 49' is typically of approximately the same width and height as the head support 27 but may also be varied. See FIGS. 2 and 9. The raised supports 49, 49' prevent or at least impede an infant which has been placed within the support 11 on a flat surface, from rolling over the raised portion. It also provides a sense of comfort and warmth to an infant in a car seat or the like, similar to a swaddle wrap. The side supports 49, 49' are designed to surround or at least provide support to the shoulder, arms and torso of an infant. The side supports 49, 49' extend relatively continuously along the mid portion 21 and the lower portion 23 of the base layer 13.

Figure 8:
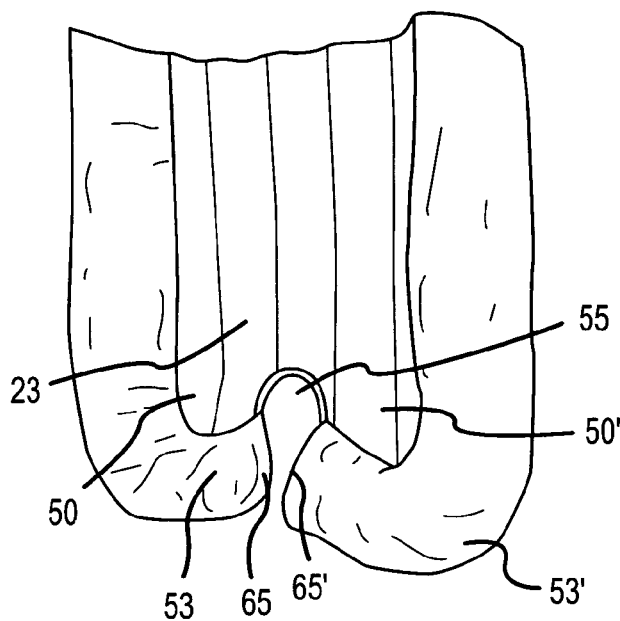
FIG. 8 is a perspective view of a lower portion of the infant support.

The side supports 49, 49' extend downwardly to form continuous foot member supports 53, 53' which may be in the shape of hook-shaped returns as shown in FIGS. 5 and 8. The hook-shaped returns provide a comfortable foot rest for an infant's feet while further providing a foot-encasing member. The inverse J-shape actually surrounds a substantial portion of an infant's foot providing a resting spot or support for an infant's foot but does not completely surround the foot or the crotch of an infant. The absence of a support along the inner thighs and crotch of an infant in this embodiment allows for freer movement of the infant and allows for easier restraint of the infant with the restraint system 58. Terminal ends 65, 65' and the lower portion 23 of the base layer 13 form a recess in the form of a generally U-shaped open slot 55 as shown in FIG. 8. The open slot 55 has upwardly convergent sides which allows passage of the restraint member 58 for securing of an infant. Further, the slot 55 permits use of a variety of child restraints and does not inhibit leg movements of an infant as with a crotch cushion.

The side supports or portions 49, 49' are attached along opposite side edges 52, 52' of the base layer 13 in spaced end-to-end relation to the side portions. See FIG. 5. The base layer 13 also has lower, bifurcated ends 50, 50' as shown in FIG. 5 which define the open slot 55. The combination of the bifurcated ends 50, 50' with the terminal ends 65, 65' form the generally U-shaped central opening 55 along the lower portion 23 of the base layer 13 as shown in FIG. 8. The side supports 49, 49' form the continuous foot rest members 53, 53' and are stitched along the outside edges of the base layer 13. Portions of the stitching lines 61 are shown in FIG. 5.

Figure 10:
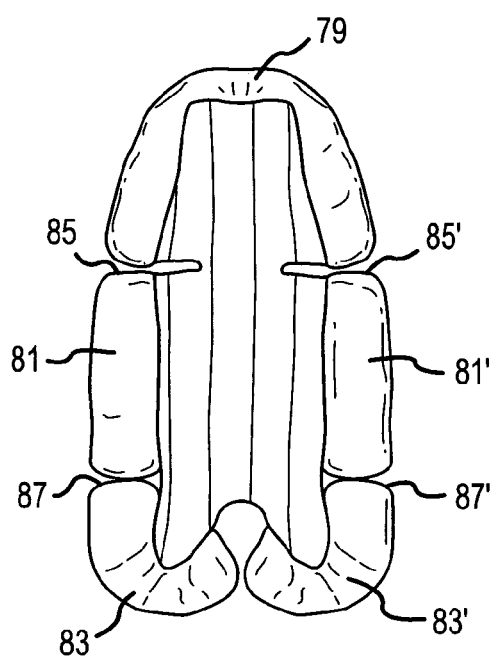
FIG. 10 is a front elevational view of a further embodiment of the infant support.

The head support and the side support foot rest combination are attached in a fixed location on the base layer forming a relatively continuous infant body support. This embodiment prevents various cushioning pieces from becoming lost or disengaged through use. Another embodiment offered by way of example but not limitation includes a tri-sectional support having a head rest member 79, separate side supports 81, 81', and a foot rest member 83, 83' as shown in FIG. 10. The tri-sectional support allows for bending or flexion at contact points 85, 85' and 87, 87' providing a comfortable, flexible infant rest while still providing adequate support.

In use, an infant may be placed within the infant body support 11. This may occur in a child carseat, or stroller or the like as shown in FIG. 3 providing additional support, especially for smaller infants. The infant may also be placed within the support on a flat surface, for example, preventing smaller infants from rolling due to the presence of the side supports. The absence of a newborn crotch section or full leg supports allows for easy diaper change of an infant and more closely resembles a swaddle wrap whereby an infant's legs are not separated. When an infant is placed within the body support and in a carseat or stroller, shoulder restraints are fed through the slots 25, 25' and a lower buckle of the child restraint 58 is passed through the slot 55 so that an infant is securely fastened without having to disassemble the carseat restraint. The present embodiments provide a support for smaller infants while providing a sense of comfort to the infant similar to swaddling of an infant.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and subcombinations as are within their true spirit and scope.

We claim:

1. An infant surround support comprising:
   a padded base layer;
   a head support member attached to an upper portion of said padded base layer having first terminal ends on opposite sides of said base layer;
   opposite side support members and foot rest members defining a raised, peripheral cushioned support having second terminal ends on opposite sides of said base layer in closely spaced, facing relation to said first terminal ends for flexing of said base layer between said first and second terminal ends;
   a lower portion of said base layer including a recess in the form of a generally U-shaped open slot; and
   said foot rest members forming an inverted J-shape in surrounding relation to said slot.

2. The infant surround support according to claim 1 wherein said cushioned support is attached to opposite sides and lower edges of said base layer, forming a relatively continuous extension along a lower portion of said base layer.

3. The infant surround support according to claim 1 wherein said open slot is adapted to receive a restraining device.

4. The infant surround support according to claim 1 wherein said foot rest members include distal ends in opposed facing relation to one another.

5. The infant surround support according to claim 4 wherein said distal ends are on opposite sides of said slot.

6. The infant surround support according to claim 1 wherein said cushioned support and said head support member substantially surround an infant upon said base layer.

7. The infant surround support according to claim 1 wherein lower ends of said side support members and upper ends of said foot rest members are spaced to permit flexing of said base layer therebetween.

8. An infant body support comprising:
a padded base layer including top and bottom surfaces adapted to extend the length of an infant;
  a raised, cushioned head support circumscribing one end of said base layer having longitudinally extending side portions with first terminal ends releasably secured to said layer;
  means for adjusting said first terminal ends, said adjusting means including a plurality of spaced connectors on said terminal ends and complementary mating connectors on said base layer;
  raised, cushioned side support members attached along opposite side edges of said base layer in spaced, end-to-end relation to said side portions having second terminal ends on opposite sides of said base layer in closely spaced, facing relation to said first terminal ends, said padded base layer being flexible between said first and second terminal ends;
  said base layer having lower, bifurcated ends defining an open slot therebetween; and
  distal ends of said side support members extending around said lower bifurcated ends and partially along an entrance of said open slot, and are of an inverted J-shaped configuration.

9. The infant body support according to claim 8 wherein said open slot has upwardly convergent sides forming an opening for a strap member.

10. The infant body support according to claim 8 wherein said base layer in combination with said distal ends forms a generally U-shaped central opening along a bottom portion of said base layer.

11. The infant body support according to claim 8 wherein said head support and said side support members substantially surround said base layer.

* * * * *